Patented Feb. 20, 1951

2,542,464

UNITED STATES PATENT OFFICE 2,542,464

CATALYTIC CONVERSION

James F. Black, Roselle, and Kenneth K. Kearby, Cranford, N. J., assignors to Standard Oil Development Company, a corporation of Delaware No Drawing. Application December 22, 1945, Serial No. 637,099

3 Claims. (Cl. 260—449.6)

This invention relates to the catalytic conversion of carbon oxides with hydrogen to form valuable synthetic products. More specifically, the invention is concerned with an improved catalyst and method of operation for the catalytic synthesis of normally liquid hydrocarbons and oxygenated compounds.

The conventional hydrocarbon synthesis processes may be divided into two broad classes, depending on the type of catalyst used and the character of reaction products obtained. One class comprises reactions using cobalt catalysts at relatively low temperatures of about 350°–450° F. and relatively low pressures of about 1–10 atm. abs. to form predominantly saturated paraffinic liquid and solid hydrocarbons from which highly valuable Deisel fuels and lubricating oils but only low octane number motor fuels may be obtained. The other class of processes employs iron catalysts at higher temperatures of about 450°–800° F. and higher pressures of about 3–25 atm. abs. to obtain a predominantly unsaturated product from which highly valuable motor fuels having satisfactory octane ratings may be recovered. Also, in this class of processes pressures of up to 100 atmospheres or higher may sometimes be used, particularly if high yields of oxygenated compounds are desired. The present invention is chiefly concerned with that type of reaction which uses iron catalysts.

Active iron catalysts are usually prepared by the reduction of various iron ores or precipitated iron oxides as well as by the decomposition of iron carbonyls. The catalytic activity of the iron may be enhanced by the addition of such promoters as various compounds of alkali metals or the oxides of chromium, zinc, aluminum, magnesium, manganese, the rare earth metals, and others, in small amounts of about 1–10%. The essential factors determining the utility of an iron catalyst are total liquid yield as determined by activity (per cent conversion) and selectivity (ratio $C_4$ and higher hydrocarbons: $C_1$ and higher hydrocarbons), olefin formation and catalyst stability. Thus, the average unpromoted iron catalysts have a selectivity of about 0.5, yielding about 140–150 cc. of liquid product per cu. m. of CO and $H_2$ consumed, which contains about 60–65% of olefin in the $C_4$ cut. These characteristics may be improved by the addition of the most active conventional promoters such as various potassium compounds, particularly potassium chloride and carbonate to a selectivity of somewhat less than 0.70, yielding about 200 cc. or less of liquid product per cu. m. of CO+$H_2$ consumed. The improvement of the olefin formation by the conventional alkali metal promoters is highly irregular. In view of the fact that the theoretical maximum yield of liquid hydrocarbons obtainable per cu. m. of synthesis gas containing 1 or 2 mols of $H_2$ per mol of CO is 290 cc. of liquid which may contain as much as 100% olefins in the $C_4$ cut, it will be appreciated that there is considerable room for improvement. However, in spite of the extensive research work conducted in the field of synthesis catalysts, we are not aware of any appreciable improvement accomplished prior to our invention beyond the figures given above. The present invention is chiefly concerned with such an improvement.

It is, therefore, the main object of our invention to provide a process for the catalytic conversion of CO and $H_2$ which affords improved yields of improved liquid products.

Another object of our invention is to provide an improved catalyst for the hydrocarbon synthesis which permits the production of improved yields of improved liquid products.

Other and further objects and advantages will appear hereinafter.

We have found that these objects may be accomplished quite generally by carrying out the synthesis reaction in the presence of a catalyst comprising iron as a catalytically active component and a fluorine compound of potassium as the promoter. While potassium fluoride is our preferred promoter other fluorine compounds of potassium particularly complex fluorides such as potassium aluminum fluoride, potassium fluosilicate, etc. may be used. The iron may be employed as an oxide, for instance in the form of red or yellow iron oxide, iron ores such as hematites, limonite, magnetite, etc. The fluorine compound of potassium may be present in amounts of 0.1–10%, preferably about 1%, of the iron oxide.

The catalysts may be prepared by moistening iron oxides with an aqueous potassium fluoride solution of suitable concentration followed by drying, sizing or otherwise forming. It may be advisable to add a small amount, such as 3-4% of a combustile binder, to aid in the pilling operation, and to remove the binder after pilling by roasting the catalyst in air at high temperatures of about 800°–1200° F. If desired, the impregnated iron oxide may be partially or substantially reduced by means of a reducing gas, such as hydrogen for about 2-6 hours at elevated temperatures of about 600°–1400° F. A sintering treatment in a non-oxidizing atmosphere at about 1000°–1800° F. for several hours may follow the reducing step. A typical method suitable for preparing our improved catalyst is as follows: 340 g. of a pigment form of red iron oxide (analyses—99.90% $Fe_2O_3$) is mixed with a solution of 3.4 g. potassium fluoride in 160 cc. of distilled water to form a paste. This paste is dried at 350° F., blended with 4% of a pilling aid (stearates) pilled and calcined 3 hours at 850° F. The pills are reduced for 3 hours with 1000 v./v./hr. of hydrogen at 900° F. and then sintered in hydrogen for four hours at 1200° F.

While the procedure described above is a preferred method of preparing our catalysts we have found that other methods may be used to incorporate fluorine compounds of potassium into the catalyst. For example, our catalysts may be prepared by treating iron or iron oxide containing a compound of potassium such as KOH, $K_2CO_3$, $KNO_3$, etc. with fluoriding materials such as $H_2F_2$, $FeF_3$, etc. Also the iron may be treated with these fluoriding materials first to introduce fluorine, and then be impregnated with KOH, $K_2CO_3$, $KNO_3$, etc. The catalyst base containing the potassium compound may be impregnated with aqueous solutions or treated with vapors of the volatile fluoriding agents at temperatures of about 100–500° C. Complex fluoriding materials such as fluosilicic acids or their salts may be used, as well as gaseous organic fluorides. Quite broadly, our invention includes treatment of iron or potassium-promoted iron catalysts with a fluorine containing material capable of introducing a fluorine compound of potassium into the catalyst.

In carrying out the hydrocarbon synthesis in the presence of a catalyst of the type above described, conventional synthesis conditions for iron catalysts may be employed, for example temperatures of about 450°–850° F., preferably 500°–700° F., pressures of about 3–25 atm., $H_2$:CO ratios in the range of about 0.6:1 to 3:1 and space velocities of about 100–2500 v./v./hr.

The following data illustrates the advantages of our improved process and catalyst over procedures using iron catalysts promoted by the most active conventional potassium compounds such as potassium chloride, potassium carbonate and potassium phosphate. A series of comparative tests carried out on such miscellaneous catalysts prepared by methods similar to that described in the above specific example, at synthesis conditions of 250 lbs./sq. in. pressure, 200 v./v./hr. space velocity, 0.8–1.1 $H_2$:CO feed ratio, and optimum reaction temperatures for the individual catalysts yielded the following results in fixed bed operation.

Table I

| Catalyst (Reduced at 900° F. and Sintered at 1200° F. Before the Tests) | Temp., °F. | Conv. Per Cent Output Basis | Selectivity $C_4+/C_1+$ | Yields of $C_4+$, Output, cc./cu.m. | |
|---|---|---|---|---|---|
| | | | | On Feed | On CO+$H_2$ Consumed |
| Red $Fe_2O_3$+1% KF | 621 | 83 | 0.73 | 168 | 218 |
| Red $Fe_2O_3$+1% KF [1] | 530 | 98 | 0.71 | 171 | 205 |
| Red $Fe_2O_3$+1% $K_2CO_3$ | 606 | 94 | 0.69 | 156 | 199 |
| Red $Fe_2O_3$+1% KCl [2] | 517 | 96 | 0.62 | 139 | 180 |
| Red $Fe_2O_3$+1% KCl [3] | 604 | 94 | 0.40 | 85 | 111 |
| Red $Fe_2O_3$+1% $K_3PO_4$ | 600 | 98 | 0.61 | 158 | 177 |
| Unpromoted Red $Fe_2O_3$ | 605 | 83 | 0.49 | 100 | 142 |

[1] Not sintered.
[2] Not sintered; operating pressure 150 p. s. l. g.; this pressure change does not appreciably affect the yield.
[3] Sintered at 1300° F.

From the above data it will be appreciated that our new process carried out in the presence of an iron catalyst promoted by potassium fluoride affords a considerable improvement with respect to selectivity and yield of liquid products which exceed those of the conventional procedures by as much as about 10–50%.

Tests carried out at optimum temperatures for olefin formation but at otherwise the same conditions as indicated in connection with Table I gave the following results:

Table II

| Catalyst (Reduced at 900° F. and Sintered at 1200° F.) | Synthesis Temp., °F. | Percent Olefins in— | |
|---|---|---|---|
| | | $C_4$ | $C_5$ |
| 99% Red $Fe_2O_3$, 1% KF | 660 | 91 | 91 |
| 99% Red $Fe_2O_3$, 1% KF [1] | 530 | 85 | 91 |
| 99% Red $Fe_2O_3$, 1% $K_2CO_3$ | 595 | 87 | 85 |
| 99% Red $Fe_2O_3$, 1% KCl [1] | 500 | 68 | 69 |
| 99% Red $Fe_2O_3$, 1% KCl [2] | 604 | 72 | |
| 99% Red $Fe_2O_3$, 1% $K_3PO_4$ | 625 | 89 | |
| Red Iron Oxide Pigment [1,3] | 615 | 60 | 60 |

[1] Not sintered.
[2] Sintered at 1300° F.
[3] Reduced at 1000–1100° F.

It will be noted that our potassium fluoride-promoted catalyst yields the highest percentage of olefins and is the only one of the iron catalysts tested that affords a considerable increase of olefin formation in combination with maximum selectivity and maximum liquid yield.

With regard to olefin formation, we have further found that the proportion of olefin produced by a KF-promoted iron catalyst increases with increasing reaction temperatures to reach a maximum at a temperature substantially higher, preferably about 10°–50° F. higher, than the optimum temperature for maximum liquid product yields. This phenomenon is the opposite of what should have been expected on the basis of the behavior of unpromoted iron catalysts. Data pertinent hereto are given below, the lowest temperatures listed corresponding approximately to those of maximum liquid yield for the particular catalysts here involved.

Table III

| Catalyst | Temp., °F. | Conv., percent | Weight percent Olefins in C₄ Cut |
|---|---|---|---|
| Red Fe₂O₃, unpromoted | 530 | 68 | 65 |
|  | 550 | 82 | 58 |
|  | 570 | 96 | 51 |
| Red Fe₂O₃+1% KF | 600 | 79 | 87 |
|  | 630 | 88 | 89 |
|  | 660 | 97 | 91 |

Therefore, if the formation of large proportions of olefins is desired, we prefer to employ reaction temperatures above about 620° F. and preferably between about 630° and 680° F.

The present invention is not to be limited by any theory of the mechanism of the process or catalyst nor to any examples given merely for illustrative purposes, but only by the following claims.

We claim:

1. An improved process for producing normally liquid olefinic hydrocarbons containing not substantially less than 89% of olefins in the C₄ cut from CO and H₂ by a catalytic synthesis reaction, which consists essentially in contacting a gas containing H₂ and CO in the ratio of about 0.8 to 1.1 at elevated synthesis pressures and at synthesis temperatures of about 630° to about 660° F. with a catalyst consisting essentially of about 99% by weight of a reduced oxide of iron and about 1% by weight of potassium fluoride.

2. The process as claimed in claim 1 wherein said catalyst is subjected to a sintering treatment in a non-oxidizing atmosphere at elevated temperatures prior to contacting the catalyst with CO and H₂.

3. The catalyst of claim 1 in which said oxide is red iron oxide and said catalyst is sintered.

JAMES F. BLACK.
KENNETH K. KEARBY.

REFERENCES CITED

The following references are of record in the file of this patent:

UNITED STATES PATENTS

| Number | Name | Date |
|---|---|---|
| 2,254,806 | Michael | Sept. 2, 1941 |
| 2,287,891 | Linckh | June 30, 1942 |
| 2,383,648 | Fulton et al. | Aug. 28, 1945 |